WILLIAM CLEMSON.

Improvement in Back Saws.

No. 119,967.  Patented Oct. 17, 1871.

Witnesses  
O. E. Duffy  
Charles Chinn

Inventor  
William Clemson  
By N. Crawford  
att'y

UNITED STATES PATENT OFFICE.

WILLIAM CLEMSON, OF MIDDLETOWN, NEW YORK.

IMPROVEMENT IN BACK-SAWS.

Specification forming part of Letters Patent No. 119,967, dated October 17, 1871.

*To all whom it may concern:*

Be it known that I, WILLIAM CLEMSON, of Middletown, in the county of Orange, in the State of New York, have invented certain Improvements in Back-Saws, of which the following is a specification, the object of this invention being to produce a superior back-saw, and a saw that when so produced will be less in its cost; and it consists in the construction of the parts and their attachment together to form the saw.

Figure 1:
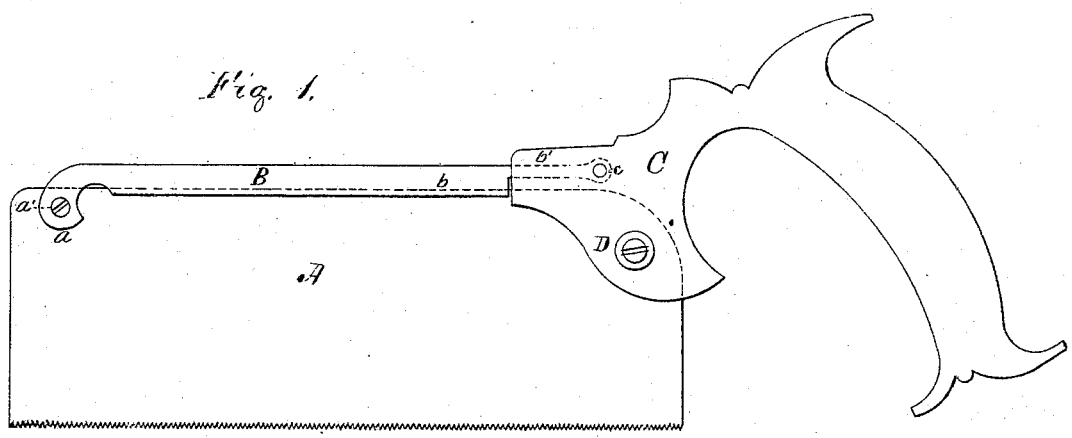
Figure 2:
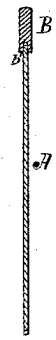

In the drawing, Figure 1 is a side view of the saw, and Fig. 2 is a transverse sectional view through the back and blade.

A is a common saw-blade of a back-saw. B is the back or strengthening-bar, and has a longitudinal central groove, $b$, of the thickness of the saw on its lower edge, with a circular drop, $a$, at its forward end, and a tang or shank, $b'$, at its handle end. C is the handle, of such form as to be taken hold of by the hand and balance the saw in its work, and has a mortise in its forward end to receive the tang $b'$ of the back bar B; also, a groove or slit, as is usual, to receive the heel of the saw and hold it from working laterally. In the circular drop $a$, at the forward end of the back bar B, is a hole with a screw-thread tapped in one side, and in the tang is another, while the handle C has a hole in it to correspond with the hole in the tang, in which is a rivet or pin to hold the back bar in the handle, and another to receive the screw D that holds the handle to the saw. Saw-blade A has a hole near its forward upper corner to correspond with the hole in the circular drop at the forward end of back bar B to receive a screw, $a'$, and another in its heel end to coincide with the hole in the handle to receive the screw D.

When the parts are thus constructed they are put together by first placing the saw in the groove $b$ in the back B, and then insert the screw $a'$ in hole $a$ and turn it home; then insert the heel of the saw in the slit and the tang in the mortise of the handle and forcing them to their proper position, when rivet $c$ is put into a hole in the handle through the tang and riveted to the handle. Screw D, which is a common hand-saw-handle screw, is put in its place in the handle through the saw-blade and turned home, and the saw is complete.

A saw thus made is cheaper in its construction, and, when needed, easily repaired.

Having thus described my invention, what I claim, and desire to secure by Letters Patent, is—

The back-saw herein described, when formed with the saw-blade A, grooved back-bar B, and handle C, and connected together in the manner herein described.

WM. CLEMSON.

Witnesses:
   LEMUEL WHEELER,
   CHAS. I. HUMPHREY. (131)